Dec. 12, 1967     R. E. MEYERS     3,357,178
ACTUATOR FOR TURBINE STATOR BLADES
Filed May 6, 1966     4 Sheets-Sheet 1

INVENTOR.
ROBERT E. MEYERS
BY
Gordon N. Cheney
AGENT

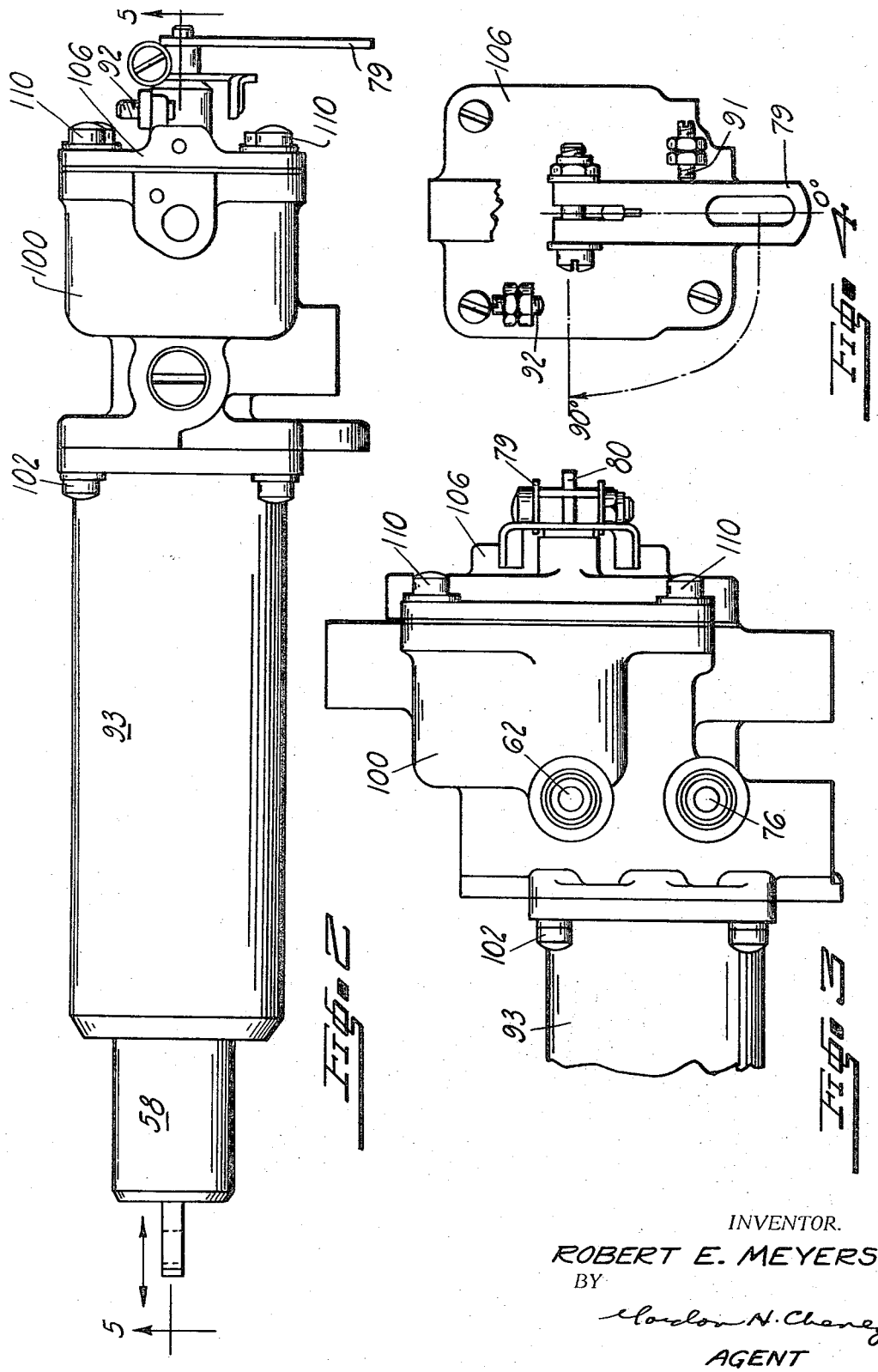

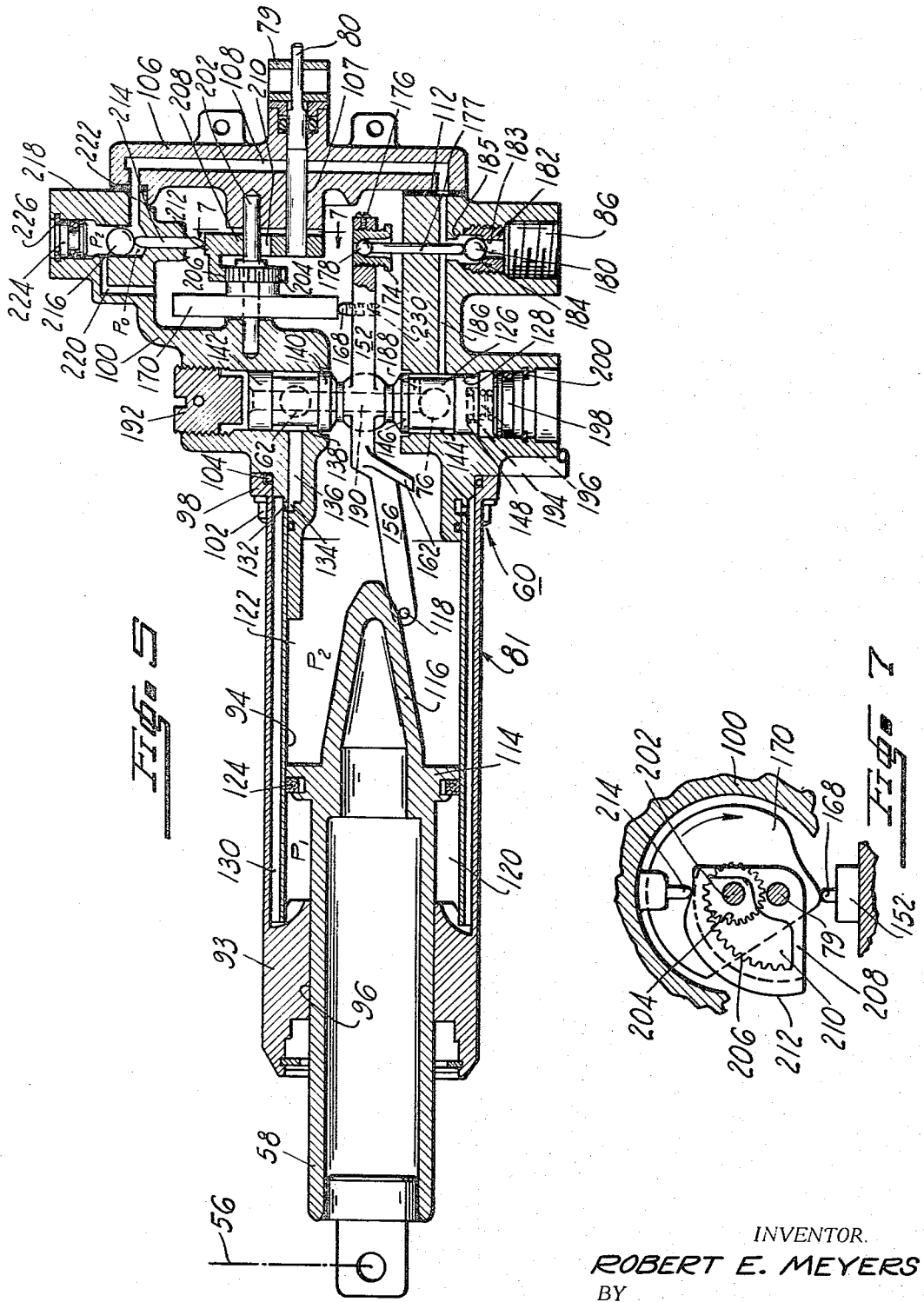

Dec. 12, 1967 R. E. MEYERS 3,357,178
ACTUATOR FOR TURBINE STATOR BLADES
Filed May 6, 1966 4 Sheets-Sheet 4

INVENTOR.
ROBERT E. MEYERS
BY
Gordon H. Chenez
AGENT

United States Patent Office 3,357,178
Patented Dec. 12, 1967

3,357,178
ACTUATOR FOR TURBINE STATOR BLADES
Robert Everett Meyers, South Bend, Ind., assignor to The Bendix Corporation, a corporation of Delaware
Filed May 6, 1966, Ser. No. 548,254
7 Claims. (Cl. 60—39.25)

ABSTRACT OF THE DISCLOSURE

A servo powered actuator having an output power member and control means therefor wherein the control means includes an input variable rise cam bearing against a resiliently loaded cam follower and a second variable rise cam contoured in reverse relative relationship. The undesired cam torque generated by the input cam is compensated for by a force producing medium bearing against the second cam which generates a torque in opposition to the torque of the first cam to thereby nullify the latter torque. The torque generated by the second cam also may be controlled to exceed the torque generated by the input cam to provide powered return action on the latter cam.

---

It is an object of the present invention to provide a turbine stator vane or blade actuator which is relatively simple in construction, reliable, durable, accurate in operation and relatively inexpensive which characteristics meet the general requirements of an engine control component in the automobile gas turbine engine field.

It is another object of the present invention to provide a hydromechanical fluid servo powered actuator wherein a significant portion of the control components therein including a control cam are mounted on a removable portion of the actuator casing to facilitate assembly or disassembly of the actuator components.

It is still another object of the present invention to provide a hydromechanical fluid servo powered actuator wherein undesired cam torque produced by a resiliently loaded cam follower bearing against a variable rise cam is compensated for by an opposing torque produced by force producing means bearing against a second variable rise cam.

It is an important object of the present invention to provide a turbine stator vane actuator which is readily and consistently responsive to a control input signal.

Other objects and advantages of the present invention will be apparent from the following description taken in conjunction with the accompanying drawings wherein:

FIGURE 2 is a plan view of the turbine stator vane actuator shown detached from the remaining structure of FIGURE 1;

FIGURE 3 is a plan view similar to FIGURE 2 but with the turbine stator vane actuator revolved through 90°;

FIGURE 4 is an end view of the turbine stator vane actuator of FIGURE 2;

FIGURE 5 is a sectional view taken on line 5—5 of FIGURE 2;

FIGURE 7 is a sectional view taken on line 7—7 of FIGURE 5;

Figure 1:
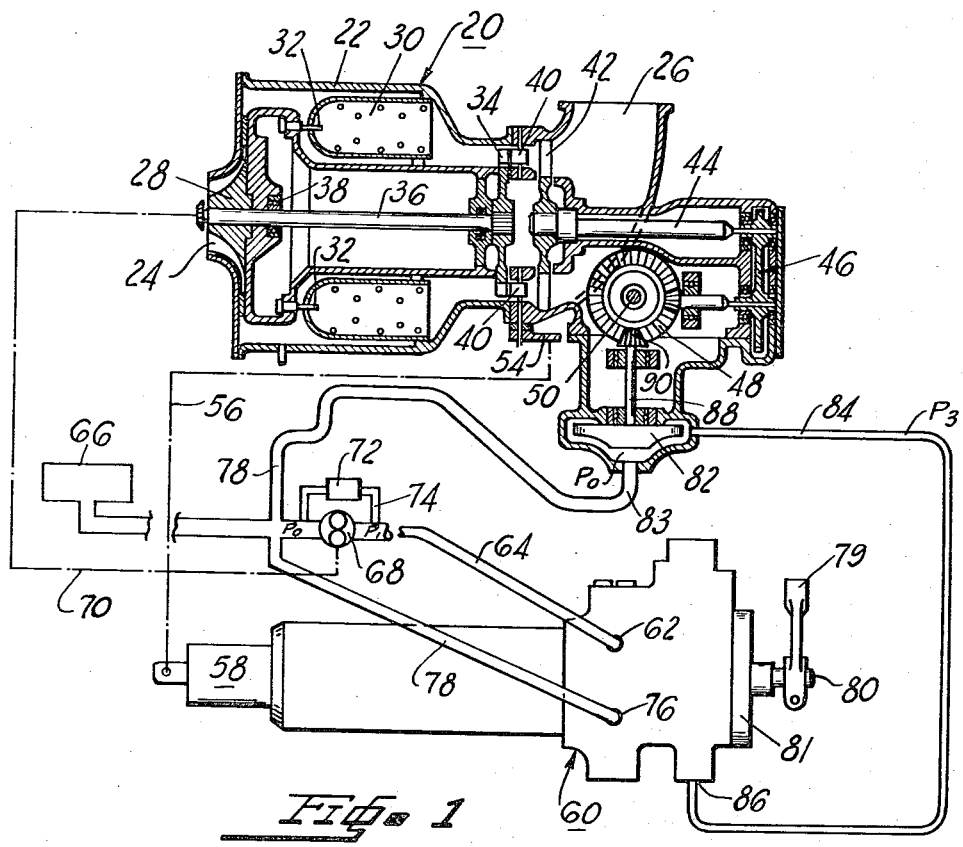
FIGURE 1 is a schematic representation of a gas turbine engine and turbine stator vane actuator therefor embodying the present invention.

Referring to FIGURE 1, numeral 20 represents an automobile type gas turbine engine having a casing 22 provided with an air inlet 24 and an exhaust opening 26. A centrifugal air compressor 28 is adapted to receive air from inlet 24 and pressurize the air which subsequently flows to one or more combustion chambers 30. A metered flow of pressurized fuel is supplied from a suitable fuel control, not shown, to fuel nozzles 32 connected to inject fuel into associated chambers 30. A suitable fuel control for use with the gas turbine engine 20 is shown and described in Patent No. 3,105,354 issued October 1, 1963, to Howard L. McCombs, Jr., and having a common assignee. The fuel injected to nozzles 32 mixes with the pressurized air in chambers 30 and is burned to provide hot motive gas which passes through a turbine 34 connected to drive compressor 28 via a shaft 36 mounted for rotation in suitable bearings 38. From turbine 34 the hot motive gas passes through a plurality of circumferentially arranged spaced apart adjustable or variable position stator vanes or blades 40 which direct the flow of gas to a power turbine 42 from which the gas exhausts to the atmosphere or other suitable relatively low pressure source via exhaust opening 26. The power turbine 42 is connected to drive a shaft 44 suitably mounted for rotation in casing 22. The shaft 44 is connected to a gear train generally indicated by 46 which transmits power to a ring gear 48 suitably secured to a drive shaft 50 which, in turn, rotates the driving wheels of a vehicle, not shown.

The stator vanes or blades 40 may be interconnected by suitable linkage means, not shown, so as to move simultaneously in response to actuation of a lever 54 pivotally mounted on casing 22 and connected via suitable linkage means generally indicated by 56 to a movable output member 58 of actuator 60.

The actuator 60 is provided with a port 62 connected to a fluid supply passage 64 leading to a suitable source of fluid 66 such as oil or possibly fuel. An engine driven pump 68 connected to shaft 36 by suitable driving means generally indicated by 70 serves to pressurize the fluid in supply passage 64 which pressure $P_1$ is controlled to a substantially constant value on the order of 100 p.s.i. by suitable pressure control means which may take the form of a conventional pressure regulating valve mechanism 72 in a bypass conduit 74 connected to passage 64 at the upstream and downstream sides of pump 68. A port 76 in actuator 60 is connected to a passage 78 leading to passage 64 at relatively low pump inlet pressure $P_0$. The actuator 60 is adapted to respond to a first input signal provided by a control lever 79 secured to a shaft 80 rotatably carried by casing 81 of actuator 60 and to a second input signal provided by a centrifugal pump 82 which receives fluid from passage 78 at relatively low pump inlet pressure $P_0$ via passage 83 and discharges fluid at pressure $P_3$ to a passage 84 leading to a port 86 in actuator 60. The pump 82 may be driven by ring gear 48 through a rotatably mounted shaft 88 and pinion 90 and generates the fluid pressure $P_3$ which is a function of the speed of rotation of the driveshaft 50 and thus speed of the vehicle driven thereby.

The control lever 79 may be connected to a conventional foot actuated accelerator pedal or other operator actuated control member, not shown, and is adapted to be actuated through a 90° arcuate range of positions as indicated in FIGURE 4. Adjustable stops 91 and 92 carried by a cap 106 and engageable with lever 79 establish the minimum and maximum angular positions, respectively, of control lever 79.

Referring to FIGURE 5, the actuator casing 81 is partially defined by a cylinder portion 93 having a bore 94 therein and an opening 96 at one end thereof through which output member 58 slidably extends. The opposite end of cylinder portion 93 is provided with a flange 98 which bears against a mating shoulder of a second chambered section 100. A plurality of bolts 102 threadedly engaged with section 100 serve to securely clamp flange 98 to the mating shoulder of section 100. An O-ring 104 suitably carried by flange 98 serves to prevent fluid leakage between flange 98 and adjacent the mating shoulder. The opposite open end of chambered section 100 is closed by a cap 106 having an opening 107 therein through which shaft 80 extends. A drain passage 108 is formed in cap 106. A plurality of bolts 110 (FIGURE 2) extending through cap 106 into threaded engagement with section 100 serve to removably secure cap 106 to section 100 with a gasket 112 interposed therebetween to prevent outward fluid leakage.

The output member 58 is provided with an integral piston 114 including an axially extending contoured end portion 116 which defines a position feedback cam surface against which a follower pin 118 rides. The piston divides bore 94 into two variable volume chambers 120 and 122 containing fluid at pressure $P_1$ and $P_2$, respectively, and is recessed to accommodate an annular seal 124 for reducing fluid leakage thereacross. The fluid pressure $P_2$ in chamber 122 is controlled by a spool valve 126 slidably carried in a bore 128 in chambered section 100 and adapted to control flow of fluid at pressure $P_1$ from port 62 to chamber 122 and outflow of fluid at pressure $P_2$ from chamber 122 to drain port 76 at pressure $P_0$. The chamber 120 is vented continuously to port 62 via passages 130 and 132 in cylinder portion 92, annulus 134 and passage 136 in section 100 and annulus 138 partially defined by spaced apart lands 140 and 142 of spool valve 126 regardless of the position occupied by spool valve 126 within its intended range of travel. The chamber 122 is vented to port 62 at pressure $P_1$ via annulus 138 when spool valve 126 is displaced downward, as viewed in FIGURE 5, from a substantially null position shown thereby permitting metered flow across land 140. The chamber 122 is vented to drain port 76 at pressure $P_0$ via annulus 144 partially defined by spaced apart lands 146 and 148 of spool valve 126 when spool valve 126 is displaced upwardly from the null position shown thereby permitting metered flow across land 146. It will be understood that the null position occupied by valve 126 may be defined as a position whereby land 146 is axially spaced slightly from the adjacent cooperating edge of bore 128 to define a metering area through which sufficient fluid at pressure $P_2$ is vented to drain port 76 to compensate for fluid leakage across piston 114 and/or land 140 into chamber 122.

Figure 6:
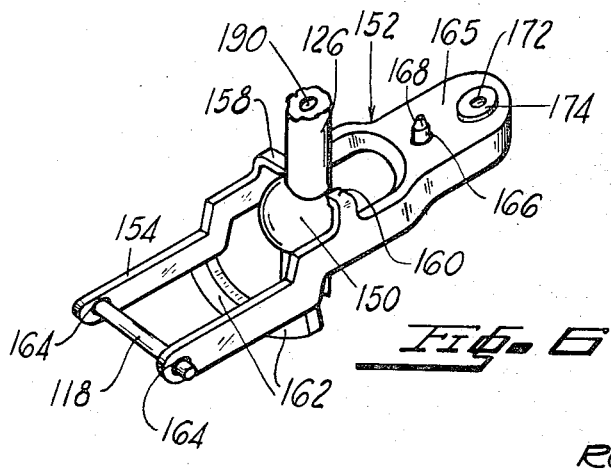
FIGURE 6 is an isometric view of a portion of the structure of FIGURE 5.
Figure 8:
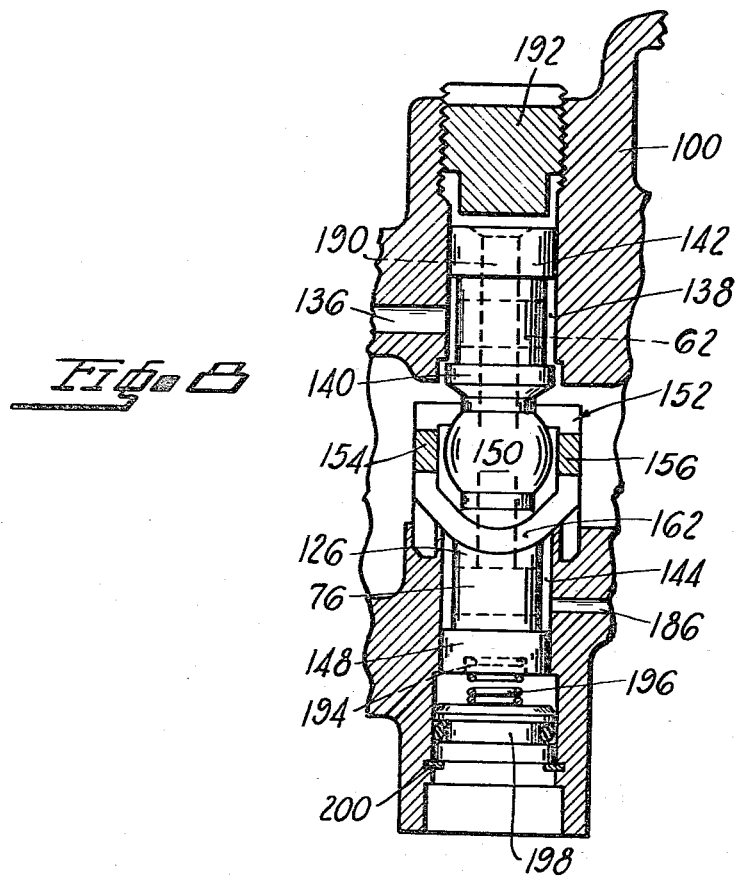
FIGURE 8 is an enlarged view of a portion of the structure of FIGURE 5.

Referring to FIGURES 5, 6 and 8 the center portion of valve 126 is defined by a substantially spherical bearing member 150. A lever 152 is provided with parallel space apart arms 154 and 156 which straddle bearing member 150. Arms 158 and 160 integral with arms 154 and 156, respectively, extend inwardly therefrom into engagement with bearing member 150. The ends of arms 158 and 160 are curved to conform to the surface of bearing member 150 to thereby permit a limited range of universal motion of lever 152 relative to spool valve 126 and thus minimize undesired binding therebetween in the event of misalignment of lever 152 and spool valve 126. The arms 154 and 156 are supported in spaced apart relationship by a strut 162 fixedly secured thereto. Axially aligned openings 164 in the free ends of arms 154 and 156 receive follower pin 118 which is fixedly secured in position by any suitable means such as a press fit. The opposite end of lever 152 is provided with a flat section 165 bridging arms 154 and 156. An opening 166 in section 165 is adapted to receive a cam follower 168 which rides against the surface of a rotatable cam 170 (FIGURE 5) to thereby actuate lever 152 in response to the rotational position of cam 170. A threaded opening 172 in section 165 receives an adjustable cup shaped retainer 174 threadedly engaged therewith and locked in position by a set screw 176. A rod 177 slidably carried by section 100 is provided with a ball member 178 fixedly secured to one end thereof. The ball member 178 is slidably carried by retainer 174 and is adapted to seat against the one end thereof under certain conditions as will be described later. A ball member 180 is slidably retained by an adjustable tubular member 182 threadedly secured in a bore 183 in section 100. The bore 183 and tubular member 182 are provided with seats 185 and 184, respectively, against which the ball member 180 is adapted to bear. The bore 183 is vented at one end to port 36 at pressure $P_3$ and at the opposite end to annulus 144 at drain pressure $P_0$ via a passage 186 which also communicates with drain passage 108 in cap 106. Thus, the ball member 180 is subjected to a $P_3-P_0$ pressure differential which upon reaching a predetermined value displaces ball member 180 upward against seat 185 thereby displacing rod 177 and ball member 178 accordingly as will be described later.

The spool valve 126 is pressure balanced by means of a radial passage 188 and axial passage 190 formed therein which communicate opposite ends of spool valve 126 with annulus 144 at drain pressure $P_0$. An adjustable plug 192 threadedly engaged with section 100 at one end of bore 128 serves as a stop member to limit the axial travel of spool valve 126 upwardly as viewed in FIGURE 5 which, in turn, limits movement of lever 152 accordingly thereby preventing the follower pin 118 from overtraveling the end portion 116 when the latter moves to the left beyond follower pin 118. The spool valve 126 is provided with a recess 194 at one end thereof which receives a compression spring 196 having one end retained by a plug 198 secured in bore 128 by a retaining ring 200. The spring 196 loads spool valve 126 into engagement with lever 152 which, in turn, is urged upwardly to effect engagement of follower pin 118 and follower 168 with end portion 116 and cam 170, respectively.

The cam 170 is rotatably supported by a shaft 202 supported at its opposite ends in section 100 and cap 106. A gear 204 integral with cam 170 is adapted to mesh with a gear sector 206 integral with a driving member 208 carried on the end of shaft 80 and rotatable in response to movement of control lever 79 carried on the opposite end of shaft 80. The shaft 202 extends through an arcuate slot 210 formed in driving member 208 (FIGURE 7) which slot permits at least a 90° range of pivotal movement of driving member relative to shaft 202. A cam surface 212 formed on the periphery of driving member 208 is engaged by one end of a rod 214 slidably carried by section 100. The opposite end of rod 214 extends into engagement with a ball member 216 slidably carried in a bore 218 formed in section 100. A passage 220 communicates bore 218 on one side of ball member 216 with the interior of section 100 at pressure $P_2$. A passage 222 communicates cylinder 218 on the opposite side of ball member 216 with drain passage 108 at pressure $P_0$. The open end of cylinder 218 is closed by a plug 224 suitably secured in position by a retaining ring 226.

Conveniently, the cam follower 168 and/or the cam follower end of rod 214 may take the form of a writing tip of a conventional ball point pen. It has been found that such a tip may be suitably secured in opening 166 of lever 152 by a set screw 230 or other retaining means with the exposed ball portion of the tip riding against cam 170. Also, such a tip may be suitably secured to the one end of rod 214 which engages cam surface 212. Since the followers are immersed in fluid, the ball is satisfactorily lubricated permitting the ball to rotate on its seat within the cage portion retaining the ball thereby minimizing the friction generated between cam 170 and follower 168 and thus reducing wear on the surface of cam 170 and cam surface 212.

OPERATION

It will be assumed that a vehicle powered by the gas turbine engine 20 is motionless with compressor 28 operating at idle speed. Under such conditions, the control lever 79 and component structure of actuator 60 are positioned substantially as shown in the drawings. The position of the stator blades 40 is indicated by point A in FIGURE 9 which corresponds to a minimum angular displacement of blades 40 relative to the blades of power turbine 42 which, in turn, minimizes the driving effect of the hot motive gas directed by blades 40 to the power turbine 42.

Assuming that it is desired to accelerate the vehicle to a given speed, the operator of the vehicle actuates the accelerator pedal, not shown, to a position approximating the desired higher vehicle speed. The fuel control, not shown, responds to the accelerator pedal to effect an increase in fuel flow to the combustion chambers of the engine in a conventional manner to cause engine acceleration. The control lever 79 is actuated clockwise as viewed in FIGURE 4 in response to the accelerator pedal and causes clockwise rotation of cam 170 as viewed in FIGURE 7. The ratio between gear sector 206 and gear 204 is approximately 2½ to 1 such that, assuming the control lever 79 to move to a 70° angular position in response to the accelerator pedal movement, the cam 170 moves through 175°. The follower 168 moves upward in response to cam 170 permitting lever 152 to pivot counterclockwise about follower pin 118 which rests against end portion 116 thereby displacing spool valve 126 upward under the influence of spring 196 from the position shown in FIGURE 5. The retaining member 174 carried by lever 152 moves upward causing ball 178 slidably engaged therewith to unseat. The ball 178 and attached rod 177 and ball 180 remain in the position shown by virtue of the force unbalance generated by the relatively high pressure $P_2$ acting across an effective area equal to the cross sectional area of rod 177 acting in opposition to the relatively low pressure differential $P_3-P_0$ acting across the ball 180. As the vehicle accelerates from a standing position, a fluid pressure $P_3$ is generated by pump 82 at a vehicle speed of approximately 15 m.p.h. which generated pressure is applied to ball 180 where the upwardly acting force overcomes the opposing force derived from pressure $P_2$ acting across the aforementioned area equivalent to the cross section of rod 177 thereby displacing ball 180 upwardly against seat 185. The ball 178 being attached to ball 180 through rod 177 slides in retainer 174 toward the closed end thereof but does not seat against retainer 174 thereby not affecting the existing position of lever 152. The point F in FIGURE 9 may be taken as representative of the point at which the aforementioned vehicle speed of 15 m.p.h. is obtained.

Figure 9:
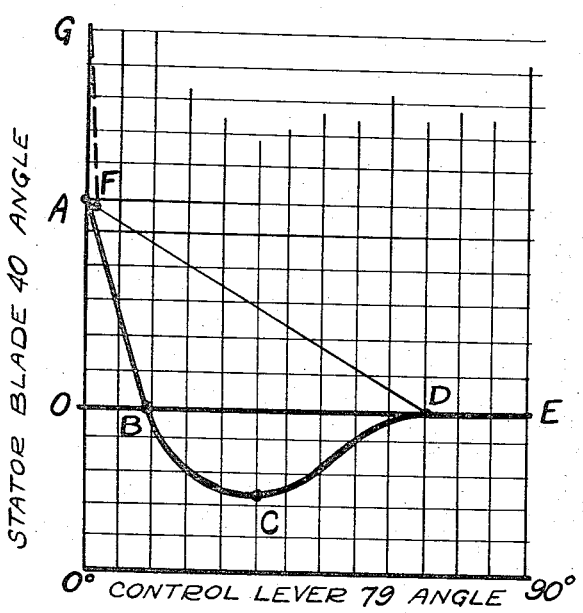
FIGURE 9 is a graph showing the relationship of stator vane position versus control lever position.

As the piston 114 and attached output member 58 move to the right, the follower pin 118 is displaced by end portion 116 causing lever 152 to pivot about follower 168 engaged with cam 170 which results in downward displacement of spool valve 126 to a position approximating that shown in FIGURE 5 whereupon the piston 114 is stabilized at point D. Point D in FIGURE 9 corresponds to the aforementioned 70° position taken by control lever 79 in response to the operator actuated accelerator pedal. It will be understood that the response of output member 58 to movement of control lever 79 is relatively rapid such that the stator blades 40 occupy position D in advance of the vehicle reaching its requested speed. Point D lies on a line labeled 0 which corresponds to an optimum stator blade angle which, in the higher engine speed range such as from point D to E, directs the hot motive gas against the power turbine 42 at a predetermined angle for optimum engine efficiency purposes in the higher speed range of operation of the engine 20. As shown in FIGURE 9, the stator blade 40 angles indicated by − and + represent angular displacement of the stator blade 40 from the optimum position in opposite relative directions to vary accordingly the vector angle of the hot motive gas impinging the power turbine 42. As the angular displacement of the stator blades 40 changes in the negative direction, the vector angle of the gas impinging the power turbine 42 decreases to point A which represents engine idle at which point the power derived from the gas impinging the turbine 42 is relatively small in accordance with the relatively low power required to sustain engine idle. Between points A and G, the angular displacement of stator blades 40 is such that the gas impinging turbine 42 tends to oppose rotation of the turbine 42 thereby producing a negative torque or braking effect thereon. In the positive direction, the vector angle of the gas impinging the power turbine 42 tends to augment rotation of the turbine 42 as will be recognized by those persons skilled in the art.

A relatively rapid acceleration such as that described above where the control lever 79 is advanced substantially instantaneously to a given angular position results in rapid movement of output member 58 such that the stator blade 40 transition approximates a straight line from point A to the requested position represented by point D. However, depending upon the degree as well as the rate of advancement of control lever 79, partial power requests will regulate the stator blades 40 to a position corresponding to curve ABCDE of FIGURE 9.

It is expected that the vehicle operator will release the accelerator pedal to initiate a vehicle deceleration. Thus, to initiate a deceleration from point D to point A in FIGURE 9, the operator releases the accelerator pedal, not shown, which moves to its engine idle position causing control lever 79 to move to its 0° position against stop 91. The cam 170 is rotated accordingly to the position shown in FIGURE 7 causing downward movement of follower 168 as viewed in FIGURE 5. The lever 152 pivots clockwise about follower pin 118 causing retainer 174 to engage ball 178 whereupon the lever 152 pivots about ball 178 in a counterclockwise direction moving follower pin 118 off end portion 116 and displacing spool valve 126 downward as viewed in FIGURE 5. High pressure fluid $P_1$ is admitted past land 140 from annulus 138 to chamber 122 causing the pressure differential $P_1-P_2$ to decrease to substantially zero. The pressure $P_2$ acts against the relatively large effective area defined by piston 114 plus end portion 116 in opposition to pressure $P_1$ in chamber 120 acting against the relatively small annular area defined by piston 114 and the resulting force unbalance displaces piston 114 to the left against cylindrical portion 93 which acts as a stop. The stator blades 40 follow output member 58 retracing the positions taken during the aforementioned acceleration as indicated by the line D to F. At point F the position of the stator blades 40 departs from that established during the aforementioned acceleration as a result of the piston 114 and attached output member 58 moving to the left of the position shown in FIGURE 5 to the limit of its travel against cylindrical portion 93. Thus, as the piston 114 moves leftward through the position shown in FIGURE 5 into engagement with cylinder portion 93, the stator blades 40 move through angular attitudes as indicated by the line F to G. In the angular position indicated by G, the stator blades 40 direct the gas flow against the power turbine 42 at an angle which opposes the rotation of power turbine 42 thereby decelerating the vehicle at a greater rate than would be obtained if the power turbine 42 was allowed to freewheel.

Upon reaching a vehicle speed of 15 m.p.h. as deceleration continues, the fluid pressure $P_3$ generated by pump 82 drops below that required to maintain ball 180 in its upward position against seat 185 whereupon the opposing pressure $P_2$ drives the ball 180 downward against seat 184 causing lever 152 to pivot clockwise about follower 168. The lever 152 displaces spool valve 126 upward allowing land 140 to block flow from annulus 138 and land 146 to vent chamber 122 to annulus 144 at drain pressure $P_0$. As the pressure $P_2$ in chamber 122 decreases, the opposing pressure $P_1$ drives piston 114 toward the right from its extreme leftward position whereupon end portion 116 picks up follower pin 118 thereby providing a position feedback sense to lever 152 which returns spool valve 126 to its null position which, in turn, stabilizes piston 114 and attached output member 58 in the position shown in FIGURE 5 which position corresponds to point A.

Referring to FIGURES 5 and 7, the cams 170 and 212 are contoured in a reverse sense in order to effectively nullify the variable torque generated by the variable rise cam 170 as a result of the spring 196 loaded follower 168 bearing thereagainst. The axes of follower 168 and rod 214 intersect the axes of shafts 202 and 80, respectively, upon which cams 170 and 212 are carried which renders the radial force vectors imposed on cams 170 and 212 substantially ineffective as far as torque considerations on the latter are concerned. However, the tangential force vector acting on the cam 170 creates a significant amount of undesirable torque which must be overcome in actuating cam 170 particularly when the latter is in a high cam rise attitude. It will be noted that the ball member 216 is subjected to a pressure differential $P_2-P_0$ which varies in accordance with the pressure $P_2$ in chamber 122 controlled by spool valve 126 to hold the piston 114 at the position dictated by cam 170. The pressure $P_2$ is controlled to a higher value in response to a rising contour of cam 170 which rising contour produces an increase in torque acting on cam 170. Thus, for a given position of cam 170, a pressure $P_2$ is generated which acts on ball 216 thereby loading the rod 214 against cam 212 which results in a tangential force vector acting through the effective radius of cam 212 thereby generating a substantially equal torque in opposition to the cam 170 torque. It will be noted that, in accordance with the above described acceleration, the pressure $P_2$ acting against ball 216 is relatively low in comparison with the pressure $P_1$ to permit the piston 114 to move to the right as viewed in FIGURE 5. However, when the accelerator pedal is released to initiate the above described deceleration, the pressure $P_2$ acting against ball 216 approaches pressure $P_1$ imposing a corresponding relatively large force upon cam surface 212 which, in turn, generates an opposing torque exceeding that generated by cam 170. This torque unbalance loads shaft 80 producing a powered return action on the control lever 79 tending to return the latter to its idle position. Normally, such return action is accomplished by a spring or the like which imposes a substantially constant force which must be overcome when the accelerator pedal is depressed by the vehicle operator. However, with the above described powered return action of cam 212, a relatively light spring instead of the above mentioned normal relatively stiff spring may be used. Since the torque generated by cam 212 in response to depression of the accelerator pedal is significantly less than the return torque generated by cam 212 when the acceleration pedal is released, the vehicle operator does not have to overcome any undesirable load created by a resisting spring or the like in depressing the accelerator pedal pedal while being assured of positive return action thereon.

The shaft 202 has a sliding fit with its mating bore in section 100 which permits the shaft 202 and attached cam 170 to be withdrawn along with member 208 when cap 106 is detached from section 100. In this manner, it becomes a relatively simple task to change cam 170 and/or member 208 for calibration purposes.

Various changes and modifications in the structure shown and described herein may be made by those persons skilled in the art without departing from the scope of applicant's invention as determined by the following claims. It will be understood that suitable conventional fluid seals may be provided to seal against fluid leakage where required.

I claim:

1. A fluid servo powered actuator comprising:
   casing means defining a chamber;
   fluid pressure responsive means slidably carried in said chamber and responsive to a variable fluid pressure;
   valve means for controlling said variable fluid pressure to vary the position of said fluid pressure responsive means accordingly;
   lever means operatively connected to said valve means for actuating the same;
   a movable control member;
   first and second rotatable cam means operatively connected to and actuated by said movable control member;
   cam follower means operatively connected to said lever means and engageable with said first rotatable cam means;
   resilient means operatively connected to said lever means for loading the same to urge said cam follower means into engagement with said first rotatable cam means;
   fluid pressure respsonsive means responsive to said variable fluid pressure and engageable with said second rotatable cam means for imposing a force load thereon which varies as a function of said variable fluid pressure;
   said first and second cam means being contoured in reverse relative senses so that the torque generated on said second cam means acts in opposition to the torque generated on said first cam means to effectively nullify the latter torque.

2. A fluid servo powered actuator as claimed in claim 1 and further including:
   a spherical bearing surface formed on said valve means;
   said lever means including first and second spaced apart lever arms straddling said spherical bearing surface and provided with first and second bearing surfaces, respectively, slidably engaged with said spherical bearing surface to permit a predetermined range of universal pivotal movement of said lever means relative to said spherical bearing surface for alignment purposes.

3. A fluid servo powered actuator as claimed in claim 1 wherein said casing means includes:
   cap means removably secured to said casing means;
   a first shaft rotatably carried by said cap means and secured at opposite ends thereof to said second cam means and said movable control member;
   a second shaft carried by said cap means and supporting said second cam means; and
   gear means operatively connected to said first and second cam means whereby said first and second cam means are caused to rotate simultaneously in response to movement of said movable control member.

4. A fluid servo powered actuator as claimed in claim 1 and including:
   first and second variable volume fluid chambers partially defined by said fluid pressure responsive means;
   a first conduit communicating said first variable volume chamber with a substantially constant relatively high fluid pressure source representing one of said two control fluid pressures;
   a second conduit communicating said second variable volume chamber with said substantially constant fluid pressure source; and
   a third conduit communicating said second variable volume chamber with a substantially constant relatively low fluid pressure source;
   said fluid pressure responsive means having a first effective area exposed to said first variable volume chamber and a second greater effective area exposed to said second variable volume chamber whereby a decrease in fluid pressure differential across said fluid pressure responsive means causes movement of the same in one direction whereas an increase in fluid pressure differential thereacross causes movement in the opposite direction;
   said valve means being operatively connected to said second and third conduits for controlling fluid flow from said second conduit to said second variable volume chamber to decrease said fluid pressure differential when actuated in one direction from a substantially null position and fluid flow from said second variable volume chamber to said third conduit to increase said fluid pressure differential when actuated in the opposite direction from said null position.

5. A fluid servo powered actuator as claimed in claim 1 wherein:
said second cam means and said fluid pressure responsive means are operative to generate a torque opposite to and exceeding the torque generated by said first cam means to provide powered return action on said movable control member.

6. A fluid servo powered actuator as claimed in claim 1 and further including:
position feedback means operatively connected to said pressure responsive means and movable therewith;
follower means operatively connecting said feedback means and said lever means for actuating said lever means; and
means operatively connected to said lever means and responsive to a control input signal for actuating said lever means to thereby override said feedback means in response to a predetermined input signal.

7. A fluid servo powered actuator as claimed in claim 1 and adapted for use with a vehicle driving gas turbine engine having a powered output turbine connected to the driving wheels of the vehicle and movable stator blades for directing the flow of combustion gas against the power output turbine at a varying effective angle to assist or retard rotation of the power output turbine, wherein:
said fluid pressure responsive means is operatively connected to the movable stator blades for actuating the same;
said movable control member being movable to various positions depending upon a desired power output from the gas turbine engine;
position feedback means operatively connected to said fluid pressure responsive means and said lever means for actuating said lever means to return said valve means to a substantially null position following actuation of said valve means therefrom to thereby stabilize said valve means;
means operatively connected to the driving wheels of the vehicle for generating a signal at a predetermined vehicle speed during an acceleration of said vehicle to a selected higher speed in response to movement of said control member; and,
means responsive to said generated signal operatively connected to said lever means for actuating the same to override said position feedback means during a subsequent vehicle deceleration from said selected higher speed whereby said fluid pressure responsive means is pressurized to a predetermined position in response to which the stator blades direct the gas flow against the power turbine in a direction to retard rotation of the same thereby assisting deceleration of the vehicle.

References Cited
UNITED STATES PATENTS

| | | | |
|---|---|---|---|
| 3,181,295 | 5/1965 | Pauwels et al. | 60—39.16 |
| 3,211,424 | 10/1965 | Lewakowski | 60—39.25 X |
| 3,252,686 | 5/1966 | Chadwick | 60—39.25 X |

JULIUS E. WEST, *Primary Examiner.*